(12) United States Patent
Schroeder et al.

(10) Patent No.: US 6,612,227 B2
(45) Date of Patent: Sep. 2, 2003

(54) PEELER HAVING A REMOVABLE LINER

(75) Inventors: Karl Schroeder, Clayton, OH (US); Duane H. Friend, West Alexandria, OH (US); Clyde W. Norman, Springboro, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 10/035,533

(22) Filed: Oct. 23, 2001

(65) Prior Publication Data

US 2003/0075058 A1 Apr. 24, 2003

(51) Int. Cl.⁷ .................................................. A23N 7/00
(52) U.S. Cl. .......................... 99/631; 99/618; 99/608; 99/623
(58) Field of Search .......................... 99/623, 627, 628, 99/629, 630, 637, 617, 618, 604, 606, 608; 264/632, 633, 642, DIG. 4

(56) References Cited

U.S. PATENT DOCUMENTS

| | | | |
|---|---|---|---|
| 877,550 A | * 1/1908 | Clark | 99/631 |
| 954,047 A | * 4/1910 | Powell | 99/631 |
| 1,476,221 A | * 12/1923 | Roylance | 99/631 |
| 1,902,506 A | 3/1933 | Johnston et al. | 99/631 |
| 4,300,447 A | * 11/1981 | Hoover | 99/516 |
| 5,617,783 A | 4/1997 | Beeler | 99/631 |

OTHER PUBLICATIONS

The "GOAT" Vegetable Peeling Machine with Monel–Metal Interiors, The Fred Goat Co., Inc., 2 pgs., no date (Admitted Prior Art).

Hobart Instruction Manual with Replacement Parts, Model 6430, 6430T, 6460 & 6460T, Potato Peelers, Hobart Corporation, pp. 1–19, 11/90.

\* cited by examiner

Primary Examiner—Reginald L. Alexander
(74) Attorney, Agent, or Firm—Thompson Hine LLP

(57) ABSTRACT

A peeler is provided having a removable liner, the liner possessing a rough texture for assisting the turning of a food product during a peeling operation. A method of manufacturing the disclosed peeler and liner is also provided.

39 Claims, 9 Drawing Sheets

PEELER HAVING A REMOVABLE LINER

TECHNICAL FIELD

The present invention relates generally to a commercial peeler, and more particularly, to a peeler having a removable liner.

BACKGROUND

Commercial peelers for peeling large quantities of food products such as potatoes are widely known. Such peelers typically include a cylindrical chamber for holding the food product and a rotary abrasive disc that turns in a circular motion at the lower boundary of the cylindrical chamber for abrading the outer layer of the food product. Commercial peelers may further include a top lid that can be opened to load new food product into the chamber for peeling, and a discharge door in the side of the chamber for removing food product that has been peeled.

An inner surface of the chamber is often provided with an abrasive to engage the food product during the peeling the operation. The abrasive surface typically does not itself perform a significant peeling function, but does assist in the peeling operation. By retarding the movement of the food product, the abrasive surface ensures relative motion between the food product and the rotating abrasive disc causing the outer layer of the food product to be abraded by the rotating disc. The engagement of the food product with the abrasive surface further causes the food product to turn during the peeling operation resulting in more even peeling with fewer flat spots.

In operation a plurality of a food product, such as potatoes, are loaded into the cylindrical chamber through the top lid. The abrasive disc at the lower boundary of the chamber is then rotated while in intimate contact with the potatoes. Once the peeling operation is completed, as determined by an operator or by the passage of a predetermined amount of time, the peeled potatoes may be removed through a discharge door in the side of the chamber. A fluid, such as water, may be sprayed into the cylindrical chamber before, during, or after the peeling operation to soften the outer layer of the food product and to rinse away the peelings.

SUMMARY

In one aspect, a peeler includes a housing and a plastic liner that is removably positioned within the housing. The plastic liner includes an inwardly facing surface at least partially defining a chamber for holding product to be peeled when the liner is positioned within the housing. The inwardly facing surface of the plastic liner has a rough texture for contacting product within the chamber during peeling and the plastic liner is biased outwardly toward an inner surface of the housing when positioned therein.

In another aspect, a peeler includes a housing and a liner removably positioned within the housing. The liner includes an inwardly facing surface having a rough texture, the inwardly facing surface at least partially defining a lateral boundary of a chamber for holding product to be peeled when the liner is positioned within the housing. The liner is formed into at least a partial cylinder having a normal outer diameter when removed from the housing, the normal outer diameter being slightly greater than an inner diameter of the housing such that the liner is at least slightly compressed when positioned within the housing.

In a further aspect, a liner installable in a housing of a peeler where the housing includes an opening therethrough is provided. The liner is formed by a thin-walled plastic unit having at least one side with a rough texture for positioning inwardly when the unit is installed. At least one keeper member is provided on the unit and located for positioning through the housing opening when the unit is installed.

In yet another aspect, a method for manufacturing a peeling unit involves the steps of: (a) bending a plastic sheet having a first side and a second side, the first side having a rough texture, the bending operation including bending the thermoplastic sheet into a curved configuration with the first side facing inwardly; and (b) positioning the bent plastic sheet within a housing to cover at least a portion of a substantially cylindrical interior surface of the housing.

DETAILED DESCRIPTION

Figure 1:
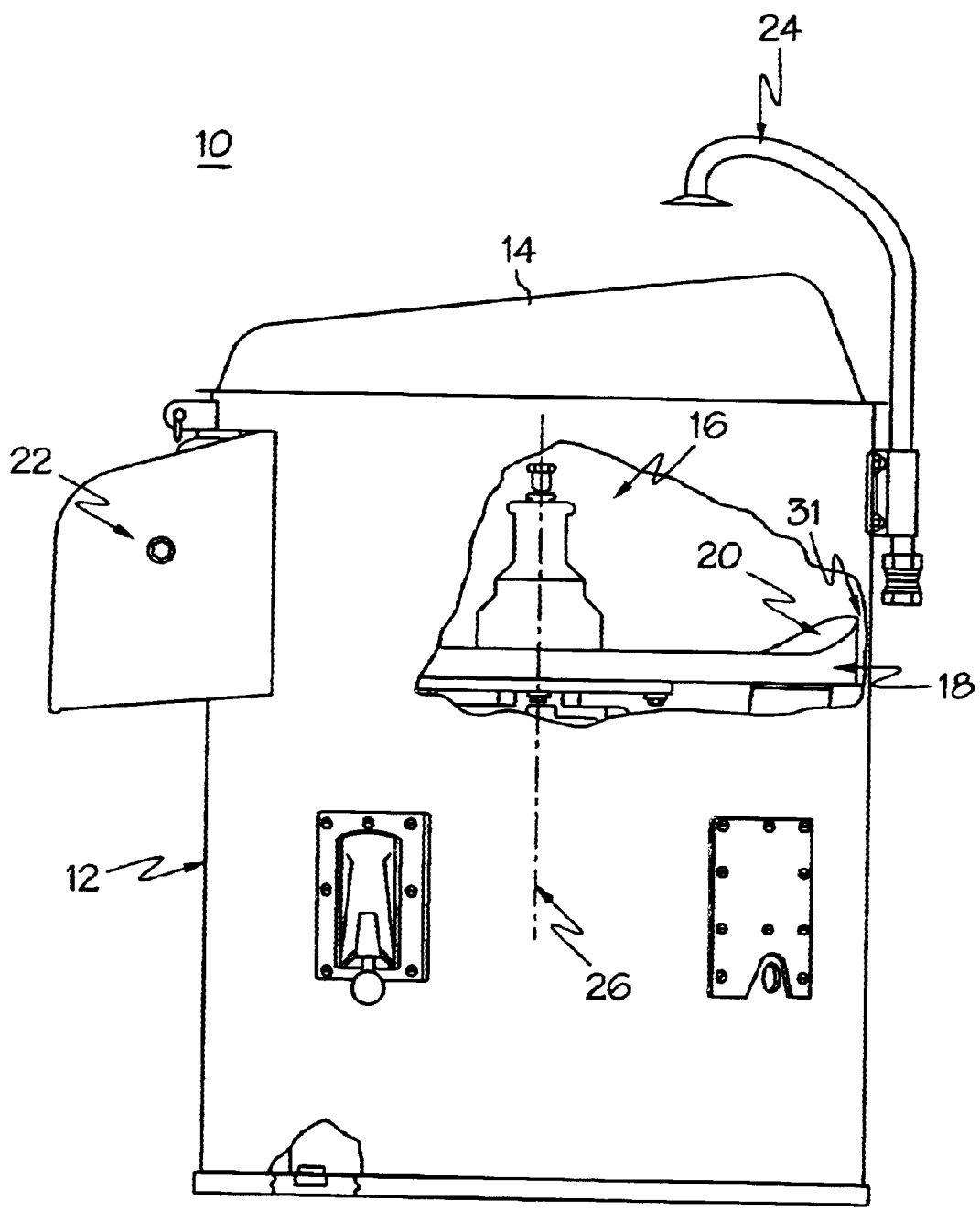
FIG. 1 is a side view of one embodiment of a peeler according to the present invention having a portion of the housing removed to expose the chamber within the peeler housing and the abrasive disc at the lower boundary of the chamber.
Figure 2:
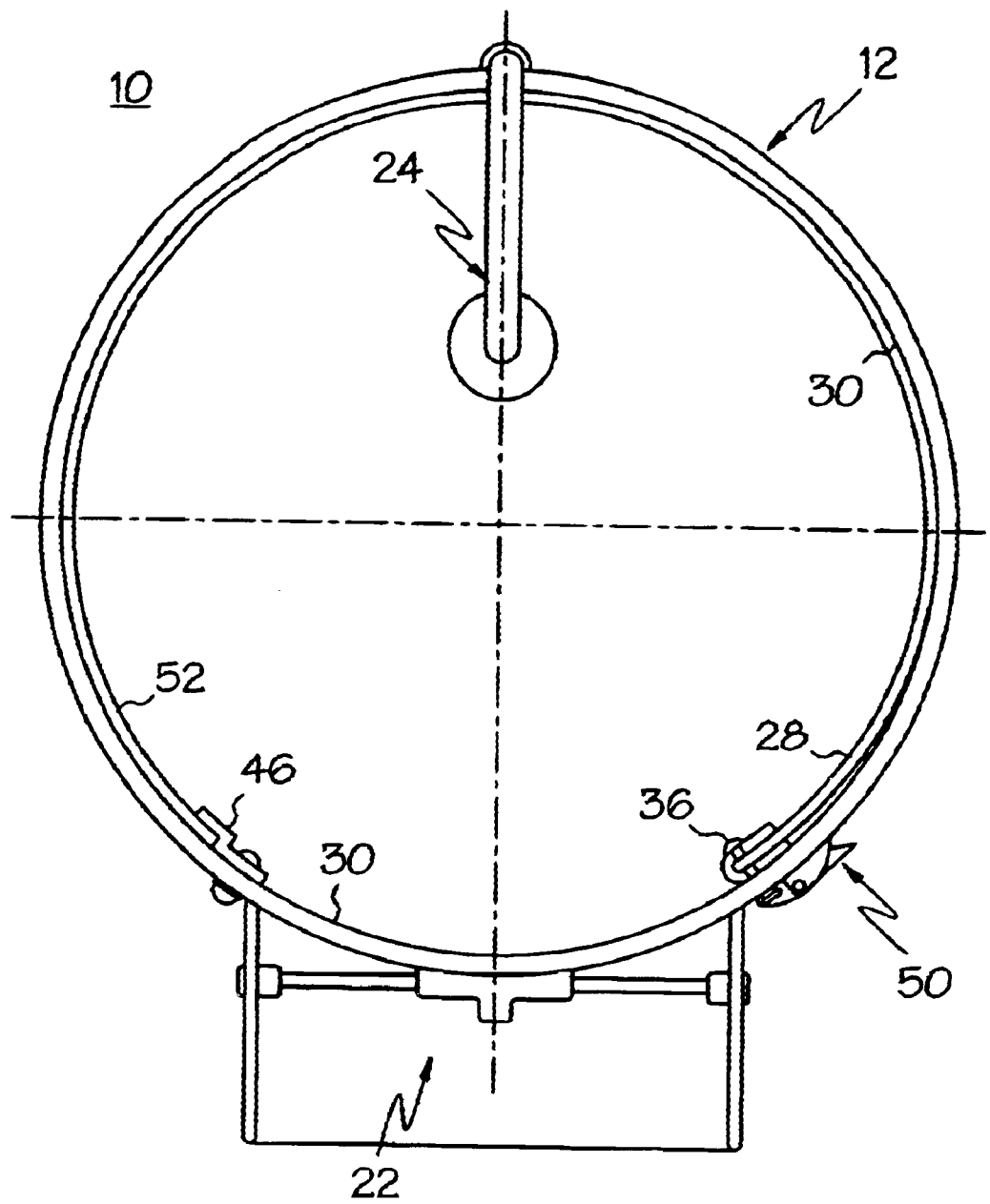
FIG. 2 is a top view of one embodiment of a peeler according to the present invention with the lid and rotating disc removed.

Referring to FIGS. 1 and 2, a peeler 10 according to one embodiment of the invention is shown. The peeler 10 includes a cylindrically shaped housing 12 with a lid 14. As used herein the terms "cylindrical" and "cylindrically shaped" are intended to cover both circular and non-circular curvatures. Positioned within the housing 12 is a cylindrically shaped chamber 16 for holding food product for peeling and a rotatable disc 18 having an undulating or wave-like upper surface 20 that is abrasive. The rotatable disc 18 defines the lower boundary of the chamber 16. The lid 14, when closed, defines the upper boundary of the chamber 16. A manually operated discharge door 22 is provided through the housing 12 and communicates with the chamber 16 for removing peeled product. A sprayer 24 is provided for rinsing the chamber or applying a softening fluid such as water to the food product to be peeled.

To load food product into the chamber 16 for peeling, the lid 14 is moved to an open position to expose the chamber 16. The chamber 16 is then filled with food product, such as potatoes, for peeling. During a peeling operation the lid 14 is closed and the disc 18 is rotated about axis 26 such that the abrasive upper surface 20 removes the outer layer of the food product. A motor (not shown) mounted below the disc 18 may be operatively connected for rotating the disc 18.

Figure 3:
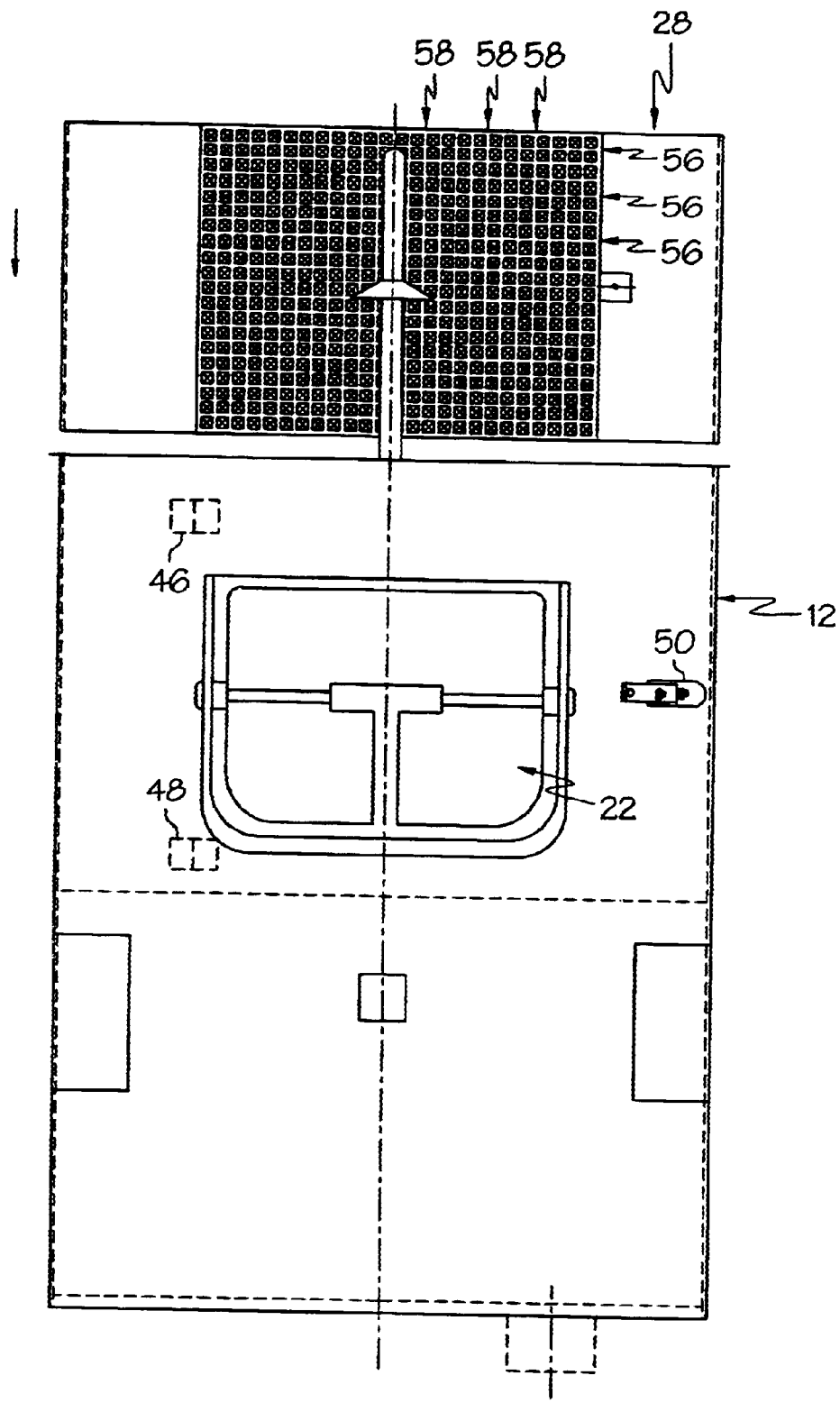
FIG. 3 is a front view of one embodiment of a peeler according to the present invention with the liner removed from the housing.

Referring to FIGS. 2 and 3, a liner 28 is removably mounted within the housing 12 and is positioned within the housing 12 so as to cover a portion of an interior surface 30 of the housing 12. In addition, the liner 28 may be positioned so as to extend at least two inches below the rotatable disc 18 which defines the lower boundary of the chamber 16. A gap 31 provided between the outer perimeter of the disc 18 and the liner 28 permits free rotation of the disc 18 and allows the peelings to fall below the disc 18. In other embodiments, when peeling large objects/products, the liner may end above the rotatable disc. The liner 28, which contacts the food product within the chamber 16, assists in the peeling operation by at least causing the food product to turn for even peeling.

Figure 4:
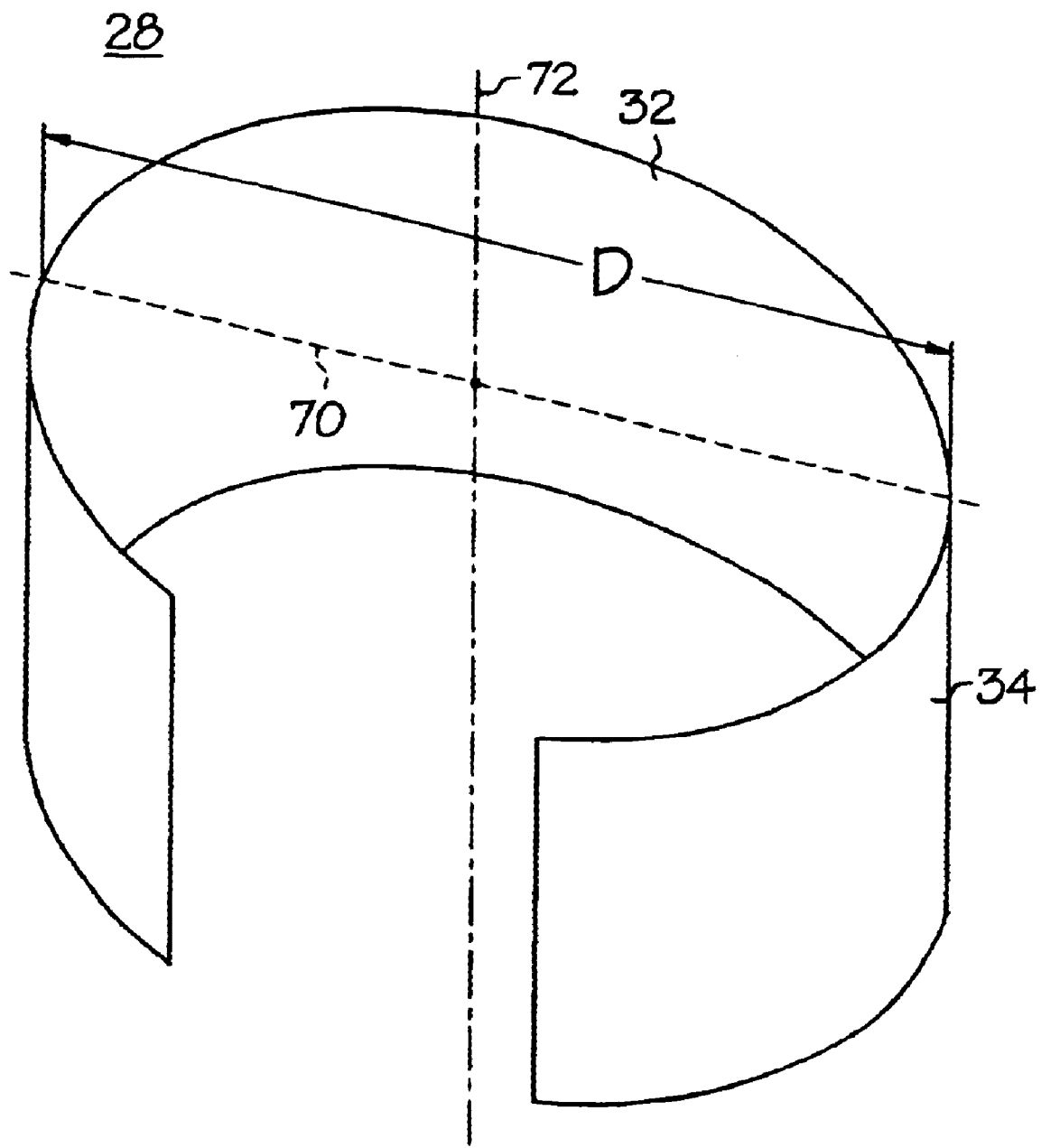
FIG. 4 is an isometric view of the liner.
Figure 5:
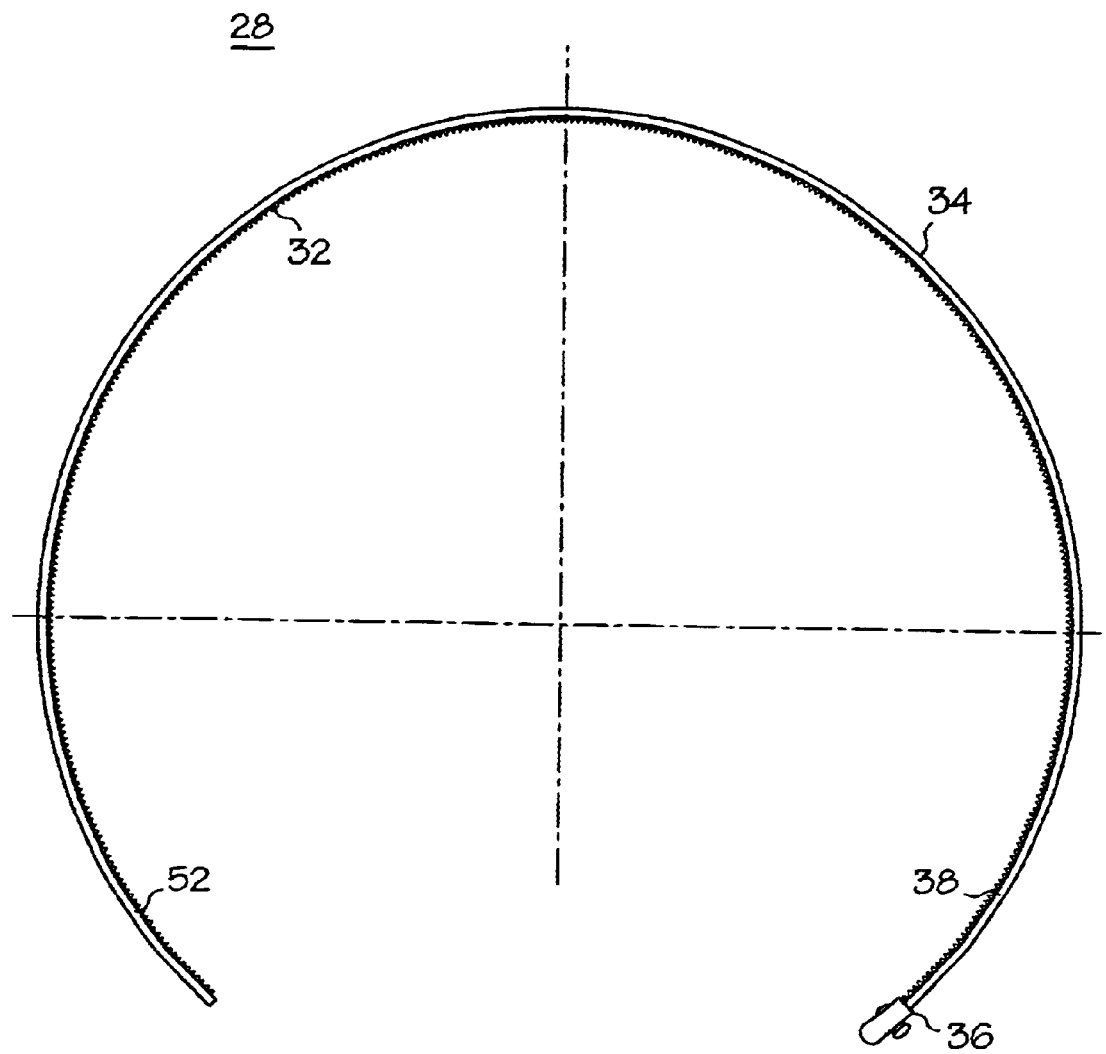
FIG. 5 is a top view of the liner.

In one embodiment, the liner 28 may be formed by a sheet of plastic that has been formed, preferably by heat, into an incomplete, thin-walled cylinder possessing a C-shaped cross-section as shown in FIGS. 4 and 5. The process of heat-forming the liner 28 includes the steps of bending a thermoplastic sheet to the desired shape and then heating the sheet while bending. The normal outer diameter of the incomplete cylinder formed by the liner 28 may be slightly larger than the inner diameter of the cylindrical housing 12. As used herein the term "normal outer diameter" of the liner refers to the largest outer side 34 to outer side 34 dimension D of the liner defined by a line 70 which intersects a central axis 72 of the liner. Accordingly, when inserted within the housing 12, the liner 28 is first compressed slightly to facilitate insertion and then expands when released to push against the interior surface of the housing 30. In this arrangement the liner is self-biased, by its elastic property, toward the inner surface 30 of the housing. When removed from the housing the liner preferably conveniently fits into a warewasher.

In one embodiment, the liner 28 includes an inwardly facing side 32 with a rough texture and a side 34 which is smooth. In one embodiment the rough texture may be formed by a plurality of projections. After heat-forming the liner 28, the side 32 faces inwardly and the side 34 faces outwardly. Opposed ends 38 and 52 of the liner are positioned on opposite sides of the discharge door 22 when the liner 28 is positioned within the housing 12.

Figure 6:
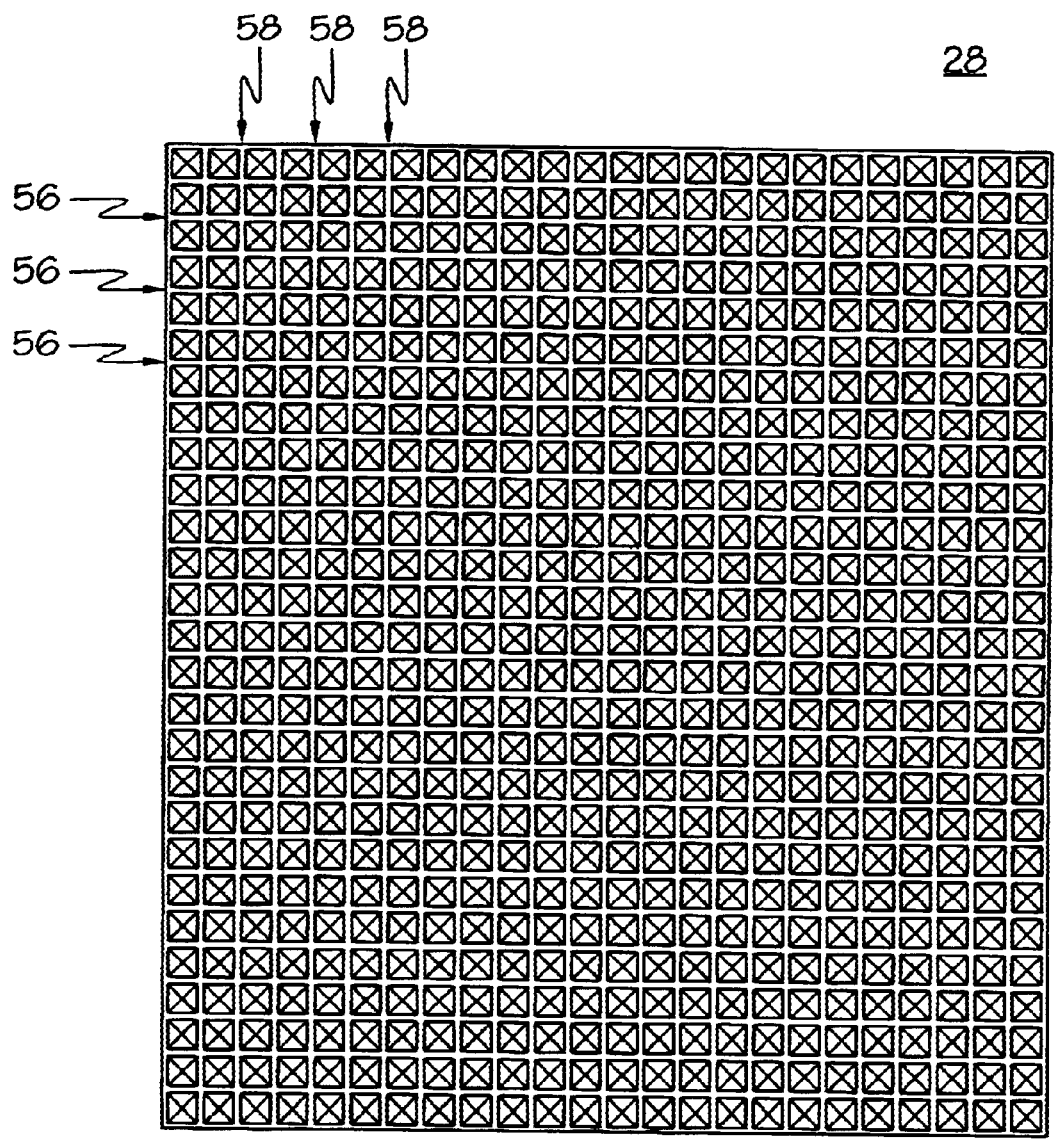
FIG. 6 is an enlarged top view of the first side of the liner.

Referring to FIG. 6, in a preferred embodiment, the plurality of projections on side 32 of the liner 28 may be formed by a pattern of evenly spaced projections arranged such that horizontal, v-shaped channels 56 and vertical, v-shaped channels 58 are formed between the projections. The base of each projection may be square-shaped and spaced from adjacent projection bases by the horizontal channels 56 and vertical channels 58. In one embodiment the thermoplastic sheet may be a polycarbonate material chosen for its durability and impact resistance. Suitable polycarbonate sheets including projections on at least one surface are Lexan polycarbonate sheets such as those commonly manufactured for use as fluorescent lamp diffusers. In other embodiments different shaped projections and patterns of projections may be used.

Figure 7:
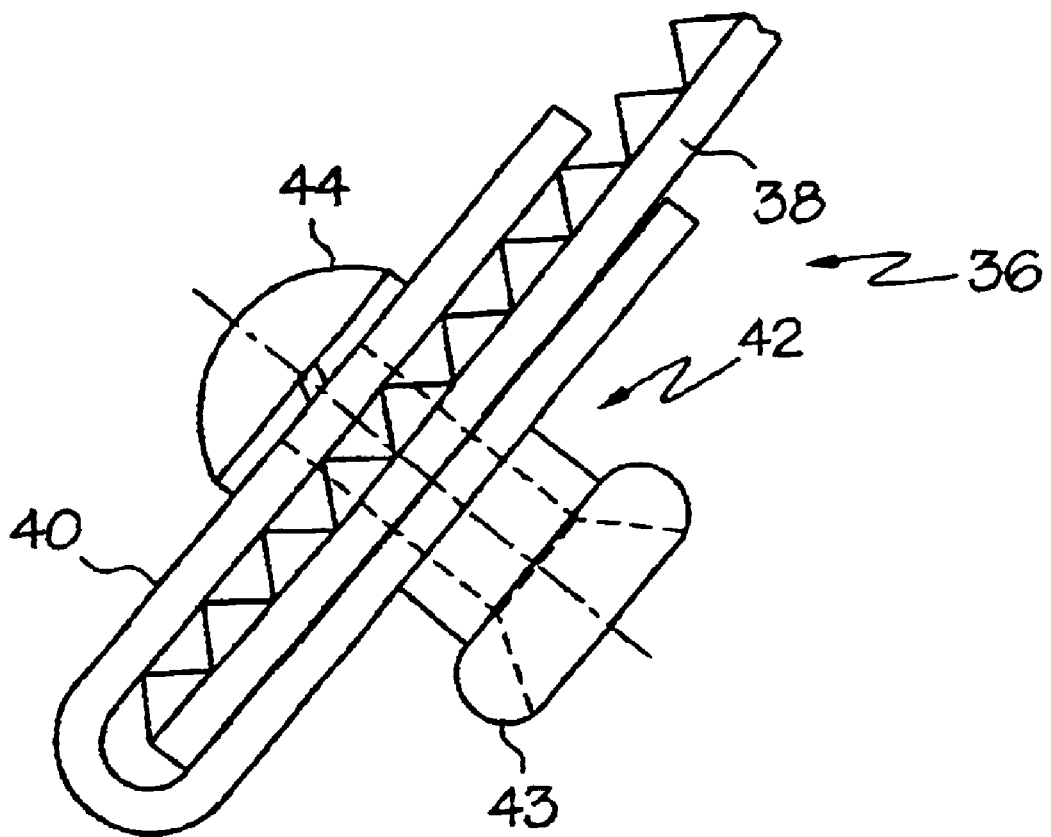
FIG. 7 is an enlarged view of the keeper assembly.

Referring to FIGS. 5 and 7, the liner 28 may further include a keeper assembly 36 mounted thereto. In the illustrated embodiment the keeper assembly is mounted near end 38 of the liner 28. The keeper assembly 36 includes a metal u-channel 40 which may be positioned over end 38 of the liner 28 at mid-height, a keeper button 42, and a screw 44. The keeper button 42 is held to the liner 28 by passing the screw 44 through an opening in the u-channel 40 and the liner 28 and threading the screw 44 into the keeper button 42. The keeper button 42 may include an enlarged outer portion 43. As shown in FIG. 5, the keeper button 42 may be positioned to extend outwardly from the second side 34 of the liner 28. The size and shape of the keeper button could vary. As used herein the terms "keeper button" and "keeper member" encompass projection(s) of the liner used for positioning the liner relative to the housing or securing the liner to the housing with a latch.

Figure 8:
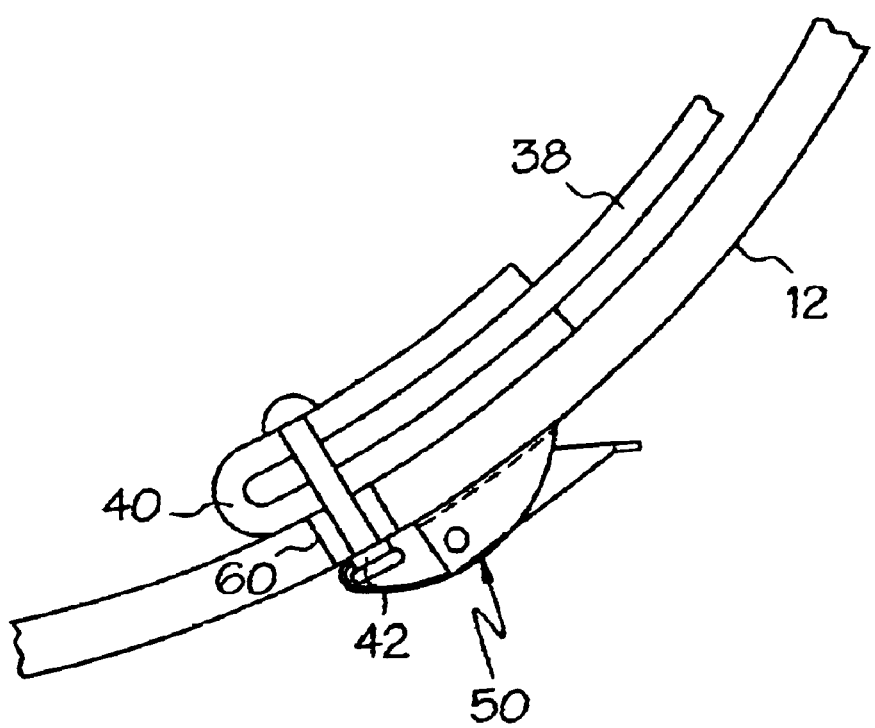
FIG. 8 is an enlarged view of the draw latch engaged with the keeper button.

As shown in FIGS. 2 and 3, the liner 28 may be removably mounted within the housing 12 using retaining clips 46, 48 and/or a draw latch 50. The retaining clips 46, 48 are mounted to the interior surface 30 of the housing 12 for slidably receiving and engaging end 52 of the liner 28 as shown in FIG. 2. Similar clips (arrange with their open sides facing upward) or some other structure extending from the inner surface of the housing 12 and positioned below the disc 18 may be provided to support the liner from downward movement. The draw latch 50 is mounted on the exterior of the housing 12 for being engaged by the keeper button 42 when the liner 28 is positioned within the chamber 16. Specifically, referring to FIGS. 2 and 8, when the liner 28 is positioned within the chamber 16 and the end 52 of the liner 28 engages with the retaining clips 46, 48, the keeper button 42 projects outwardly and through an aligned opening 60 in the housing 12 for engaging with the draw latch 50. When engaged, the draw latch 50 cooperates with enlarged portion 43 of the keeper button 42 in such a way that the liner 28 is held tightly in place against the interior surface 30 of the housing 12. When disengaged, the draw latch 50 releases the keeper button 42 and permits the liner 28 to be removed.

As one of ordinary skill in the art may contemplate, existing peelers may be adapted to use the presently disclosed liner 28. The adaptation process will trace the method of manufacture and assembly previously described but may include the additional steps of removing a prior epoxy based coating from the interior surface of the housing 30 and machining an opening in the housing to allow the keeper button 42 to pass through for engagement with the draw latch 50.

Although the foregoing description references details in accordance with the illustrated embodiment, it is recognized and anticipated that various changes and modifications could be made. For example, while the aforementioned discussion primarily focuses on the peeling of food products, other non-food products could also be peeled. In this regard, the terms "peel," "peeling" and "peeler" encompass the removal of an outer surface portion of any product or item.

As another example, while the liner is primarily described as being heat-formed using a thermoplastic sheet such as a polycarbonate sheet, it is possible a similar plastic liner having a C-shaped cross-section could be manufactured using a molding technique or that some other material could be used to form the liner.

Still further, the liner could be flat when removed from the peeler and could be bent into its C-shaped cross-section (or other cross-section) when installed within the peeler housing. In such cases the elastic property of the liner would self-bias the liner outward toward the inner surface of the housing. The normally flat liner could also be formed with both sides having a rough texture but with the roughness of the two sides differing and being tailored for peeling of respective products. Such a normally flat liner could be installed in the housing with one side facing inward for peeling a first product and could be installed in the housing with its other side facing inward for peeling a second product.

Further, while the keeper button is described as attached to the liner using an assembly, it is recognized that in some cases a suitable keeper button could be formed unitary with the liner. Still further, it is recognized that the number of keeper buttons provided could vary and that the number of corresponding latches could also vary accordingly. While two retaining clips 46 and 48 are shown in the illustrated embodiment, it is recognized that a single retaining clip or three or more retaining clips could be used, and that the shape and size of the one or more retaining clips could vary from that shown.

Additionally, although the primary embodiment of the liner is described as a unit that is at least a partial cylinder having a normal outer diameter slightly greater than the inner diameter of the housing, it is recognized that a unit having a normal outer diameter less than the inner diameter of the housing could also be utilized. In such cases the combination of the keeper member and latch could be used to bias the liner outwardly toward the inner surface of the housing. Other latches could also be used such as clamping type latches interior of the housing for biasing the liner outward toward the inner surface of the housing.

Figure 9:
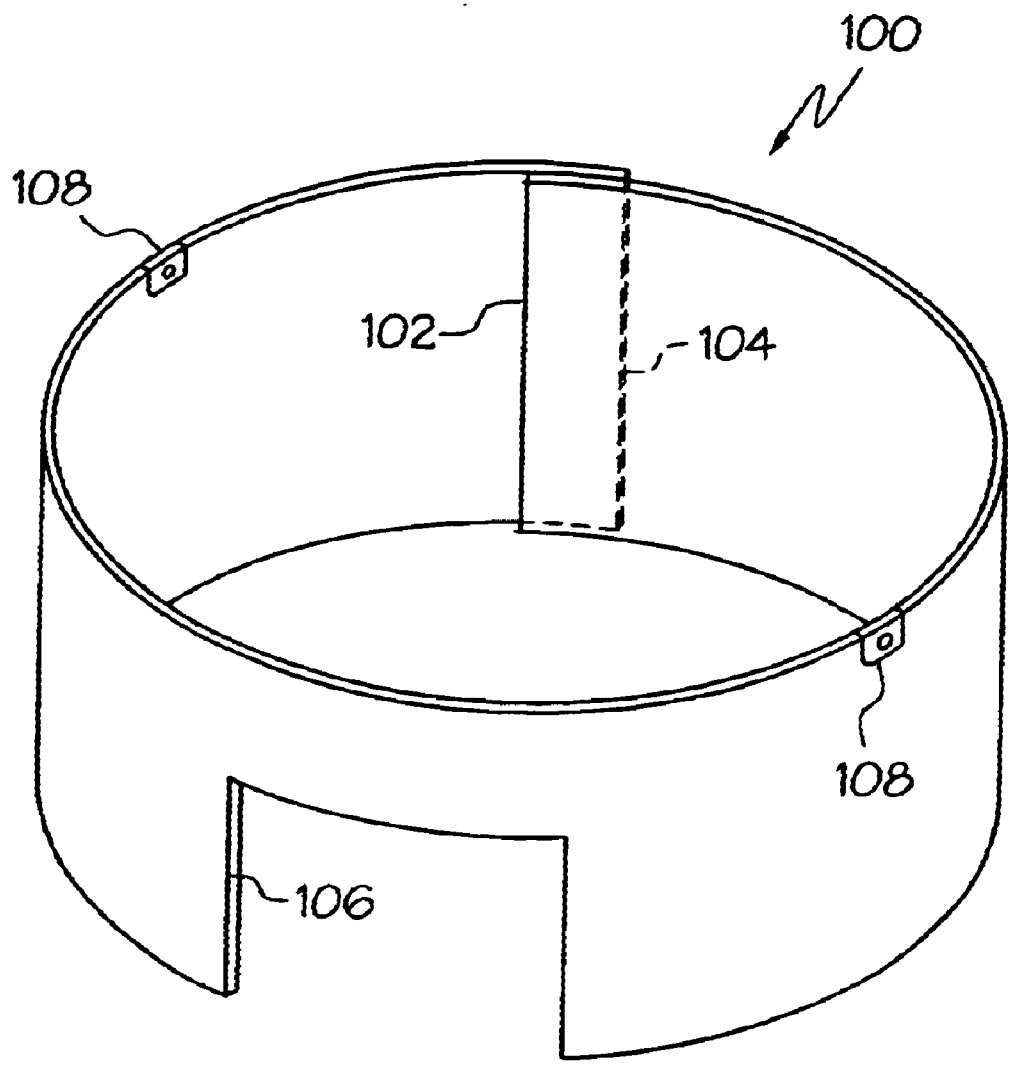
FIG. 9 is an alternative liner embodiment.

Referring now to FIG. 9, an alternative embodiment of a liner 100 is shown in which the ends 102 and 104 of the liner overlap. The liner 100 includes a cutout section 106 which is configured for aligning with the discharge door 22 of the housing 12 when the liner is installed within the housing 12. The cutout section 106 could also be formed as a window type cutout of the liner. Multiple keeper assemblies 108 may be provided for holding the liner 100 in place within the housing using corresponding latches. Other variations are possible. Similar alternative embodiments with a cutout section 106 could be formed with ends 102 and 104 abutting each other or with ends 102 and 104 spaced apart from each other to form a small gap.

What is claimed is:

1. A peeler, comprising:
   a housing;
   a plastic liner that is removably positioned within the housing, the plastic liner including an inwardly facing surface at least partially defining a chamber for holding product to be peeled when the liner is positioned within the housing, the inwardly facing surface of the plastic liner having a rough texture for contacting product within the chamber during peeling, the plastic liner being biased outwardly toward an inner surface of the housing when positioned therein, wherein the plastic liner is formed from a thermoplastic sheet that has been bent and heat-formed to retain a curved configuration.

2. The peeler of claim 1 wherein the rough texture of the inwardly facing surface of the liner is defined by plurality of projections.

3. The peeler of claim 2 wherein the plurality of projections are evenly spaced projections arranged such that horizontal and vertical channels are formed between the projections.

4. The peeler of claim 1 wherein the plastic liner is a C-shaped partial cylinder at least when positioned within the housing.

5. The peeler claim 4 wherein the housing includes a discharge door communicating with the chamber, first and second ends of the plastic liner are positioned to respective first and second sides of the discharge door when the plastic liner is positioned within the housing.

6. The peeler of claim 4 wherein the plastic liner has a normal outer diameter greater than an inner diameter of the housing, the plastic liner being at least partially compressed when positioned within the housing.

7. A peeler, comprising:
   a housing;
   a plastic liner that is removably positioned within the housing, the plastic liner including an inwardly facing surface at least partially defining a chamber for holding product to be peeled when the liner is positioned within the housing, the inwardly facing surface of the plastic liner having a rough texture for contacting product within the chamber during peeling, wherein the plastic liner includes at least one keeper member thereon and extending through an opening in the housing.

8. The peeler of claim 7 wherein the keeper member is formed as part of a keeper assembly which is mounted to the plastic liner.

9. The peeler of claim 7 wherein the keeper member is formed unitary with the plastic liner.

10. The peeler of claim 7 wherein a latch is provided on an exterior portion of the housing for engaging the keeper button.

11. The peeler of claim 1 wherein at least one retaining clip is provided on the inner surface of the housing for receiving the plastic liner.

12. The peeler of claim 1 wherein an outwardly facing surface of the plastic liner is smooth and lies adjacent the inner surface of the housing when the plastic liner is positioned within the housing.

13. The peeler of claim 1 wherein the plastic liner includes a cutout section which aligns with a discharge door of the housing when the plastic liner is positioned within the housing.

14. The peeler of claim 1, further comprising:
   a discharge door through the housing and communicating with the chamber;
   an abrasive disc defining a lower boundary of the chamber; and
   a motor operatively connected to the abrasive disc for causing rotation of the abrasive disc.

15. The peeler of claim 1 wherein the plastic liner is self-biased outwardly by an elastic property of the plastic liner.

16. A peeler, comprising:
   a housing;
   a plastic liner that is removably positioned within the housing, the plastic liner including an inwardly facing surface at least partially defining a chamber for holding product to be peeled when the liner is positioned within the housing, the inwardly facing surface of the plastic liner having a rough texture for contacting product within the chamber during peeling, the plastic liner being biased outwardly toward an inner surface of the housing when positioned therein, wherein the plastic liner is formed by a flexible, flat plastic sheet which takes a curved orientation when positioned within the housing.

17. The peeler of claim 16 wherein the plastic liner includes a first surface and a second surface, both surfaces having a rough texture permitting the liner to be positioned within the housing with either the first surface or the second surface forming the inwardly facing surface.

18. The peeler of claim 17 wherein the first surface includes a plurality of first projections, the second surface includes a plurality of second projections, the first projections being different in size or shape than the second projections.

19. A peeler, comprising:
   a housing;
   a plastic liner that is removably positioned within the housing, the plastic liner including an inwardly facing surface at least partially defining a chamber for holding product to be peeled when the liner is positioned within the housing, the inwardly facing surface of the plastic liner having a rough texture for contacting product within the chamber during peeling, the plastic liner being biased outwardly toward an inner surface of the housing when positioned therein, wherein the plastic liner is biased outwardly by a latch mechanism on the housing.

20. A peeler, comprising:

a housing;

a liner removably positioned within the housing, the liner including an inwardly facing surface having a rough texture, the inwardly facing surface at least partially defining a lateral boundary of a chamber for holding product to be peeled when the liner is positioned within the housing, the liner formed into at least a partial cylinder having a normal outer diameter when removed from the housing, the normal outer diameter being slightly greater than an inner diameter of the housing, the liner being at least slightly compressed when positioned within the housing, wherein the liner includes at least one keeper member thereon and extending through an opening in the housing.

21. The peeler of claim 20 wherein the liner is a heat-formed thermoplastic unit.

22. The peeler of claim 20 wherein the liner is a molded plastic unit.

23. The peeler of claim 20, wherein the housing includes a discharge door, the liner is a C-shaped partial cylinder with first and second ends positioned to respective first and second sides of the discharge door when the liner is positioned within the housing.

24. The peeler of claim 20 wherein the housing includes a discharge door and the liner includes a cutout section aligned with the discharge door when the liner is positioned within the housing.

25. The peeler of claim 20 wherein at least one retaining clip is provided on an inner surface of the housing for receiving the liner when positioned within the housing.

26. A liner installable in a housing of a peeler where the housing includes an opening therethrough, the liner comprising:

a thin-walled plastic unit having at least one side with a rough texture for positioning inwardly when the unit is installed, at least one keeper member provided on the unit and located for positioning through the housing opening when the unit is installed.

27. The liner of claim 26 wherein the unit is a heat-formed thermoplastic unit having a C-shaped cross-section.

28. The liner of claim 26 wherein the unit is a sheet member which is bendable into a curved orientation for installation.

29. The liner of claim 26 wherein a second side of the unit is smooth.

30. The liner of claim 26 wherein the keeper member forms part of a keeper assembly which is mounted to the unit.

31. The liner of claim 26 wherein the keeper member is formed unitary with the unit.

32. The liner of claim 26 wherein the unit includes a cutout section.

33. The liner of claim 26 wherein the rough texture of the one side is formed by a plurality of projections.

34. A method for manufacturing a peeling unit, the method comprising the steps of:

(a) bending a plastic sheet having a first side and a second side, the first side having a rough texture, the bending operation including bending the plastic sheet into a curved configuration with the first side facing inwardly;

(b) positioning the bent plastic sheet within a housing to cover at least a portion of a substantially cylindrical interior surface of the housing wherein the plastic sheet is thermoplastic, and step (a) further involves heat-forming the thermoplastic sheet to retain its curved configuration.

35. The method of claim 34, wherein step (b) further comprises the steps of:

engaging at least a portion of the plastic sheet with a retaining clip mounted to the substantially cylindrical interior surface of the housing.

36. A method for manufacturing a peeling unit, the method comprising the steps of:

bending a plastic sheet having a first side and a second side, the first side having a rough texture, the bending operation including bending the plastic sheet into a curved configuration with the first side facing inwardly;

positioning the bent plastic sheet within a housing to cover at least a portion of a substantially cylindrical interior surface of the housing;

providing a keeper member projecting from the second side of plastic sheet such that the keeper member faces outwardly.

37. The method of claim 36 wherein step (b) involves positioning the bent plastic sheet such that the keeper member passes through an opening in the housing, and engaging the keeper member with a latch.

38. A method for manufacturing a liner installable in peeling unit, the method comprising the steps of:

bending a thermoplastic sheet having a first side and a second side, the first side having a rough texture, the bending operation including bending the plastic sheet into a curved configuration with the first side facing inwardly;

heat-forming the thermoplastic sheet to retain its curved configuration.

39. The method of claim 38 including the further step of providing a keeper member projecting from the second side of the thermoplastic sheet such that the keeper member faces outwardly.

* * * * *